(12) United States Patent
Chua et al.

(10) Patent No.: US 9,407,313 B2
(45) Date of Patent: *Aug. 2, 2016

(54) RADIO HOUSING HAVING THROUGH-HOLE CONNECTOR FOR COUPLING ACCESSORIES

(71) Applicant: MOTOROLA SOLUTIONS, INC, Schaumburg, IL (US)

(72) Inventors: Hong Da Chua, Johor (MY); Kok Yong Chan, Penang (MY); Lanting L. Garra, Sunrise, FL (US); Ying Hooi Tan, Penang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/447,718

(22) Filed: Jul. 31, 2014

(65) Prior Publication Data

US 2016/0036483 A1    Feb. 4, 2016

(51) Int. Cl.
*H04B 1/38*  (2015.01)
*H04M 1/02*  (2006.01)
*H04B 1/40*  (2015.01)
*H04B 1/3827*  (2015.01)
*H01R 13/627*  (2006.01)
*H01R 24/86*  (2011.01)
*H01R 13/24*  (2006.01)

(52) U.S. Cl.
CPC .............. *H04B 1/40* (2013.01); *H01R 13/6275* (2013.01); *H01R 24/86* (2013.01); *H04B 1/3827* (2013.01); *H04B 1/3833* (2013.01); *H04M 1/0254* (2013.01); *H01R 13/24* (2013.01)

(58) Field of Classification Search
None
See application file for complete search history.

(56) References Cited

U.S. PATENT DOCUMENTS

| | | | |
|---|---|---|---|
| 3,617,985 A | 11/1971 | Kehl | |
| 5,118,309 A | 6/1992 | Ford | |
| 6,608,399 B2 | 8/2003 | McConnell et al. | |
| 6,707,858 B1 | 3/2004 | Davie | |
| 7,043,208 B2 | 5/2006 | Nigra | |
| 7,424,278 B2 | 9/2008 | Campbell et al. | |
| 7,473,111 B2 | 1/2009 | Konishi | |
| 7,697,632 B2 | 4/2010 | Khlat et al. | |
| 7,697,645 B2 | 4/2010 | Jong | |
| 7,804,922 B2 | 9/2010 | Shi et al. | |
| 7,822,385 B2 | 10/2010 | Lopez | |
| D717,260 S | 11/2014 | Kang et al. | |

(Continued)

FOREIGN PATENT DOCUMENTS

EP    1223682 B1    9/2003
EP    1855507 A2    11/2007

(Continued)

OTHER PUBLICATIONS

Binder USA—Series 770 IP67 Connectors—8 pages.

(Continued)

*Primary Examiner* — Philip Sobutka
(74) *Attorney, Agent, or Firm* — Barbara R. Doutre

(57) ABSTRACT

An interface system for communication devices comprises a radio having a through-hole opening from a front surface to a back surface, the through-hole forming a coaxial connector shaped interface for coupling to an accessory. The coaxial connector shaped interface allows for a plurality of different interchangeable electronic accessories to interface to the radio.

24 Claims, 5 Drawing Sheets

(56) References Cited

U.S. PATENT DOCUMENTS

| | | | |
|---|---|---|---|
| 9,042,846 B2* | 5/2015 | Kang | ............... H04B 1/3833 |
| | | | 455/557 |
| 2004/0204203 A1 | 10/2004 | Lee | |
| 2005/0095985 A1 | 5/2005 | Hafeoz | |
| 2006/0046793 A1 | 3/2006 | Hamilton et al. | |
| 2007/0099593 A1 | 5/2007 | Thome et al. | |
| 2009/0305643 A1 | 12/2009 | Sayers et al. | |
| 2010/0105345 A1 | 4/2010 | Thampi et al. | |
| 2010/0321899 A1* | 12/2010 | Vossoughi | ............. B60R 11/02 |
| | | | 361/728 |
| 2011/0026643 A1 | 2/2011 | Ruelke et al. | |
| 2011/0085927 A1 | 4/2011 | Su | |
| 2011/0135036 A1 | 6/2011 | Andgart et al. | |

FOREIGN PATENT DOCUMENTS

| | | | |
|---|---|---|---|
| EP | 2 006 959 | A2 | 12/2008 |
| WO | 82/01655 | A1 | 5/1982 |
| WO | 93/25008 | A1 | 12/1993 |
| WO | 02093956 | A1 | 11/2002 |
| WO | 2006/072968 | A1 | 7/2006 |
| WO | 2005/065310 | A3 | 9/2006 |
| WO | 2009089393 | A1 | 7/2009 |
| WO | 2010/002740 | A1 | 1/2010 |
| WO | 2013172879 | A1 | 11/2013 |

OTHER PUBLICATIONS

U.S. Appl. No. 29/446,471, filed Feb. 27, 2013.
U.S. Appl. No. 13/778,452, filed Feb. 27, 2013.
Corresponding International Applicaton No. PCT/US2014/016674—International Search Report with Written Opinion—mailing date May 16, 2014—22 pages.
PCT International Report on Patentability, PCT/IB2012/002589, international tiling date: Nov. 7, 2012, date of issuance: May 12, 2015, all pages.
International Search Report and Written Opinion for corresponding International Patent Application No. PCT/US2015/041751, mailed on Dec. 7, 2015.

* cited by examiner

US 9,407,313 B2

RADIO HOUSING HAVING THROUGH-HOLE CONNECTOR FOR COUPLING ACCESSORIES

FIELD OF THE DISCLOSURE

The present disclosure relates generally to interface mechanisms between a radio and an electronic accessory, and more particularly to cableless interconnect mechanisms.

BACKGROUND

Portable radios, such as two-way radios, often operate in conjunction with a variety of radio accessory devices. Designers of such devices are being challenged by an increased demand for small form factors. Existing interfaces between a radio and an electronic accessory typically rely on cable or wire connections to enable communication between the two devices. Accessory connection schemes typically reside on an outer housing surface of the radio (top, bottom, front back, left, and/or right). Placing the accessory interface on an outer side of the radio takes up space on the overall housing thereby impacting markets seeking to have a small form factor.

Additionally, for radios that accommodate a variety of different accessories, the use of different accessory interface points on the outer surface(s) of the radio takes up even more space and can cause confusion for the user. Cable and wire interface connections have further drawbacks including potential entanglement issues and the need for length adjustment from user to user.

Accordingly, there is a need for an improved radio to accessory interface that eliminates the cable or wire connection and accommodates a plurality of different accessories.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
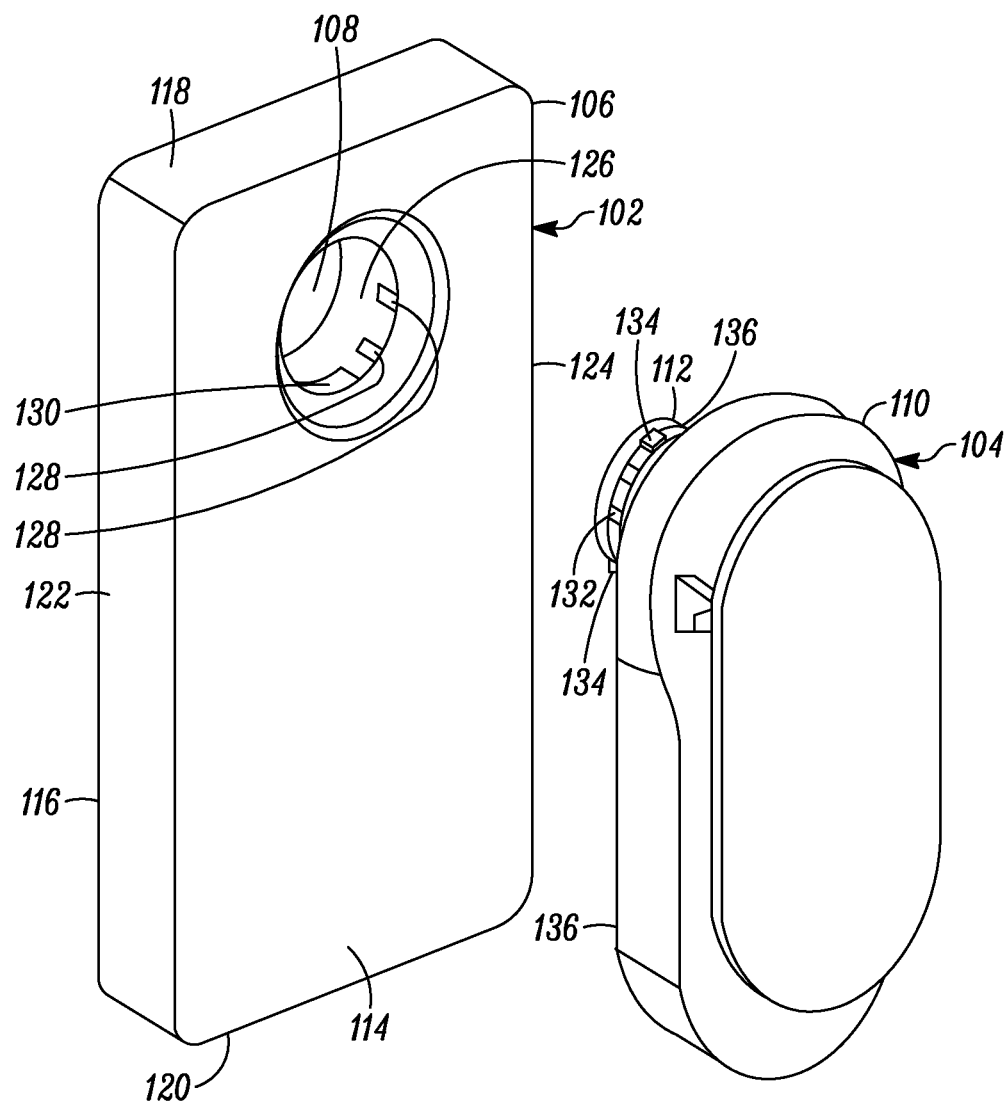
FIG. 1 is a communication interface system 100 formed in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with the various embodiments an interface is provided herein which eliminates the need for cable or wire connections between a radio and an accessory. The electrical and mechanical interface relies on a contact scheme, latching mechanism, and release button. The latching mechanism comprises a dual latch and spring to provide a locking function. The interface couples the accessory to the radio coaxially through the axis of the latching mechanism and alignment of the contacts. The interface of the accessory from the radio is decoupled by pushing the button to release the latching mechanism thereby releasing the accessory from the radio. A plurality of interchangeable accessories such as charging accessories and audio accessories, to name a few, can be advantageously accommodated through the same interface. The embodiments provided herein provide a common base structure at the radio side to accommodate a variety of different accessories, even accessories having different contact configurations. The coaxial type coupling and button release decoupling make the interface secure, robust and easy to use.

FIG. 1 is a communication interface system 100 formed in accordance with the various embodiments. The communication interface system 100 couples and decouples a radio 102 and an accessory 104. Radio 102 may be a portable two-way radio or other battery operated portable communication device. Accessory 104 is likewise an electronic device having the purpose of extending or increasing the functionality of radio 102. Radio 102 comprises a radio housing 106 containing electronic circuitry, such as a controller, a transceiver and other communication electronics (not shown). The radio housing 106 is formed of a plurality of surfaces, shown as a back surface 114, a front surface 116, a top surface 118, a bottom surface 120, a first side surface 122, and a second side surface 124. Radio housing 106 comprises a through-hole 108 opening from the front surface 116 to the back surface 114. In accordance with the various embodiments, the through-hole 108 forms an interior circular wall 126 having a coaxial connector shaped interface to which a plurality of different accessories can interchangeably couple. The coaxial connector shaped interface of through-hole 108 comprises first and second slots 130 and a plurality of interface contacts 128 disposed on the interior wall 126 for mating with the accessory 104.

Acessory 104 also contains electronic circuitry (not shown) for supporting the accessory function. The accessory 104 comprises an accessory housing 110 having a circular release button 112 extending therefrom. First and second latches 134 and a plurality of electrical contacts 132 are situated along an exterior perimeter wall 136 of the accessory housing 110 for mating and interconnecting with the coaxial connector shaped interface of radio 102. The first and second latches 134 are spring loaded, and the electrical contacts may comprise a plurality of spring loaded electrical contacts 132 or other suitable contacts for mating with corresponding flat radio contacts 128 of radio 102. While the various embodiments are described with spring loaded electrical contacts, other contacts such as magnet contacts may also be suitable.

In accordance with the various embodiments, the interface system 100 provides a mechanical connection which is made coaxially by slots 130 of radio 102 and spring loaded latches 134 of accessory 102. The interface system 100 can accommodate a variety of different shaped accessory housings having the external release button 112 formed in accordance with the various embodiments. Thus, in accordance with the embodiments, an accessory 104 having a release-button 112 with exterior latches 134 and electrical contacts 132 can be inserted into the through-hole 108 of and coupled to the interior circular wall 126 of the radio 102. For example, the accessory 104 may be powered by the radio through the interface as long as the contacts provide power and ground contacts. By providing a power source to at least one of the radio interface contacts, a variety of accessories can be powered by the radio. The accessories may comprise for example a light, a speaker, a microphone, speaker/microphone combination, to name a few.

Figure 2:
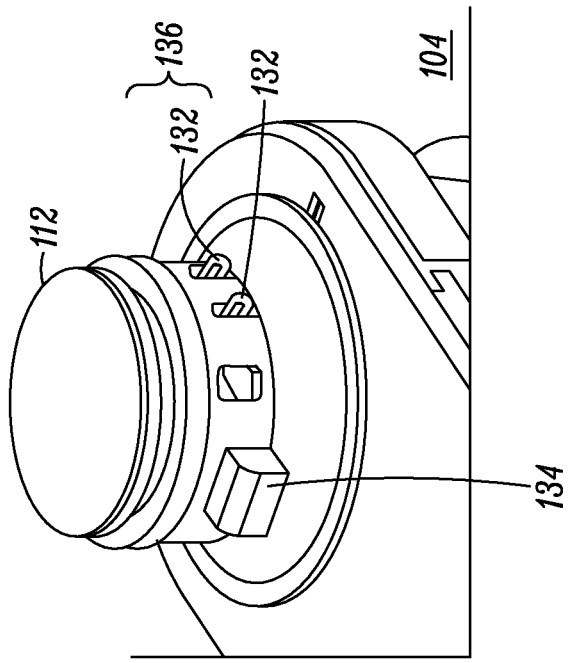
FIG. 2 shows a more detailed view of the radio inner wall with electrical contact and accessory release-button in accordance with the various embodiments.
Figure 2:
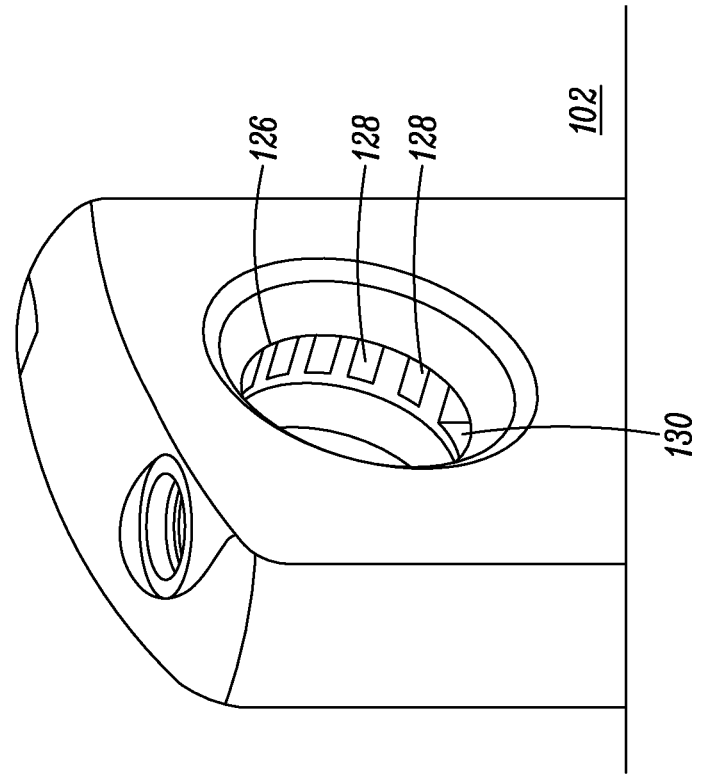

FIG. 2 shows a more detailed view of the radio interior circular wall 126 with electrical contacts 128 and accessory release button 112 in accordance with some embodiments. A proper interconnect is made by insertion of the release-button 112 of the accessory 104 into the through-hole 108 of the radio 102. Upon insertion of the button 112 into the through-hole 108, the interior wall 126 of the radio 102 causes the first and second latches 130 of the accessory 104 to compress inwards. The accessory 104 may be turned to engage the first and second latches 134 into the first and second corresponding slots 130 of the radio 102 which thereby aligns and mates the spring loaded electrical contacts 132 of the accessory 104 with corresponding contacts 128 of the radio 102. The use of the two mechanical latches 134 at the accessory 104 and two corresponding slots 130 at inner wall 126 of the radio 102 ensure a robust attachment between the accessory and the radio. Once inserted into slots 130, the two latches 134 are not rotatable to ensure the device is attached in the desired direction and to further ensure that the electrical contacts 132 are aligned with the contacts 126 at the radio side.

Figure 3:
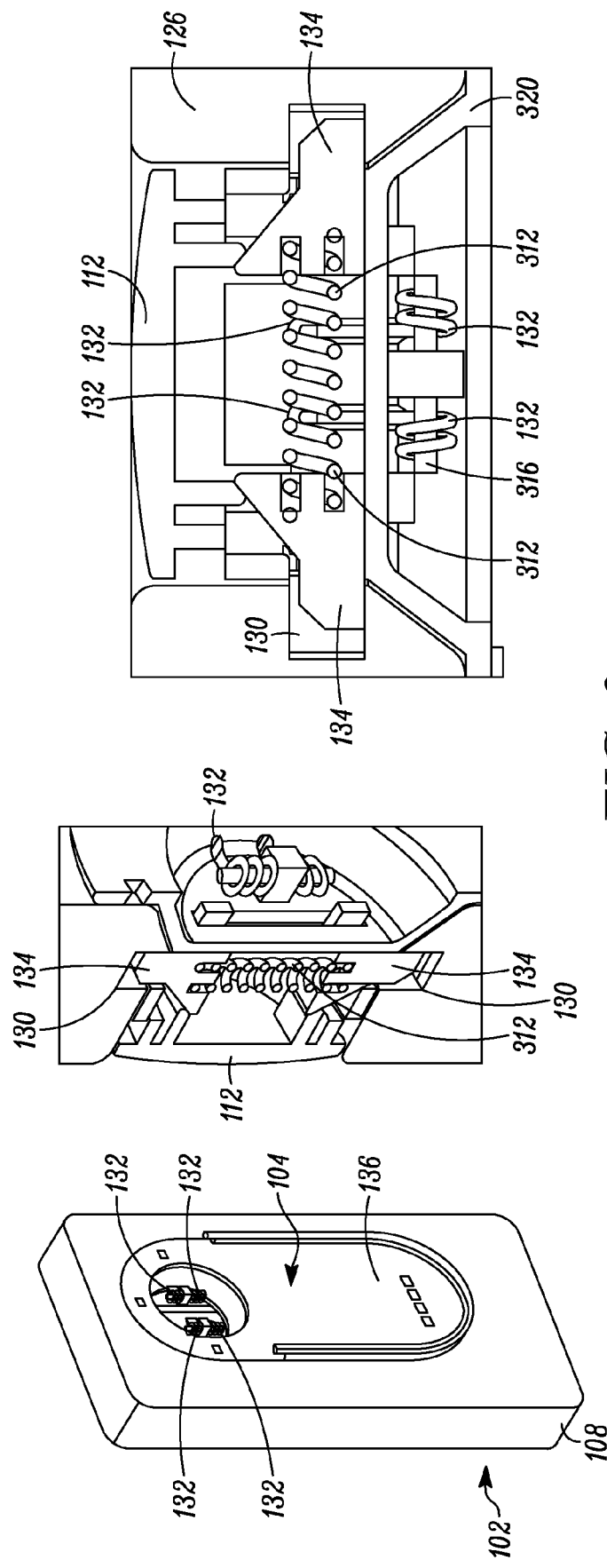
FIG. 3 shows a set of cut-away and cross-sectional views of the accessory and radio in accordance with the various embodiments.

FIG. 3 shows cut-away views of the accessory 104 coupled to the radio 102 in accordance with the various embodiments. These views show details pertaining to the release-button 112 of accessory 104 when coupled to radio 102. The internal elements of release button 112 comprise the plurality of electrical contacts, shown here as spring loaded electrical contacts 132, and a coiled spring 312 coupled between the two latches 134. The release-button 112 is used to operate the latches 134 and coiled spring 312. The electrical spring contacts 132 of accessory 104 are independent of the coil spring 312 as the function of the electrical spring contacts is to maintain electrical coupling with the radio 102 while the coil spring 312 operates the retention coupling of the latches 130.

To lock the accessory 104 to radio 102, the release-button 112 is inserted into the through-hole 108 of radio 102, such that the exterior wall 136 of release-button 112 faces the interior wall 126 of radio 102. Once the latches 134 are inserted within the radio inner wall 126, the latches 134 will automatically compress inward and compress the coiled spring 312. The accessory 104 may be snapped in or twisted in place. Upon snapping or twisting the accessory 104, the compressed latches 134 are moved toward the slots 130 such that the latches 134 drop in and release, or decompress, within slots 130 thereby securing secure the accessory 104 to radio 102.

The interface system 100 thus provides both a mechanical and electrical interface. The mechanical interface is provided by the latches 130 being engaged within the slots 134, and the electrical interface is provided by the spring loaded electrical contacts 132 of accessory 104 aligning and compressibly mating with the flat electrical contacts 128 on the radio inner wall 126.

To release the accessory 104 from the radio 102, the release-button 112 is pressed, which causes the latches 130 to retract thereby compressing the coiled spring 312 thereby releasing the accessory 104 from radio 102. Once the button 112 is released, the compressed coiled spring 312 pushes the latches 134 outward thereby ensuring the latches return back their original (non-compressed) positions.

The use of two latches 130 is advantageous in that it ensures a non-rotatable interface secured in the desired direction to avoid detachment of the accessory while providing proper electrical interconnect to the contact terminals 128 on the radio side.

Depending on the number of accessories and interface connections desired, more electrical interface contacts can be used at the radio side to meet a plurality of accessory options. Because the release-button 112 plugs into the through-hole 108, unused contacts on the radio side are not left exposed during operation of an accessory having fewer contacts at the accessory side. The combination of circular through-hole 108 having both mechanical and electrical elements along with the release-button 112 having mechanical and electrical elements provides a common, universal non-cable interface that can accommodate a plurality of different interchangeable accessories.

Figure 4:
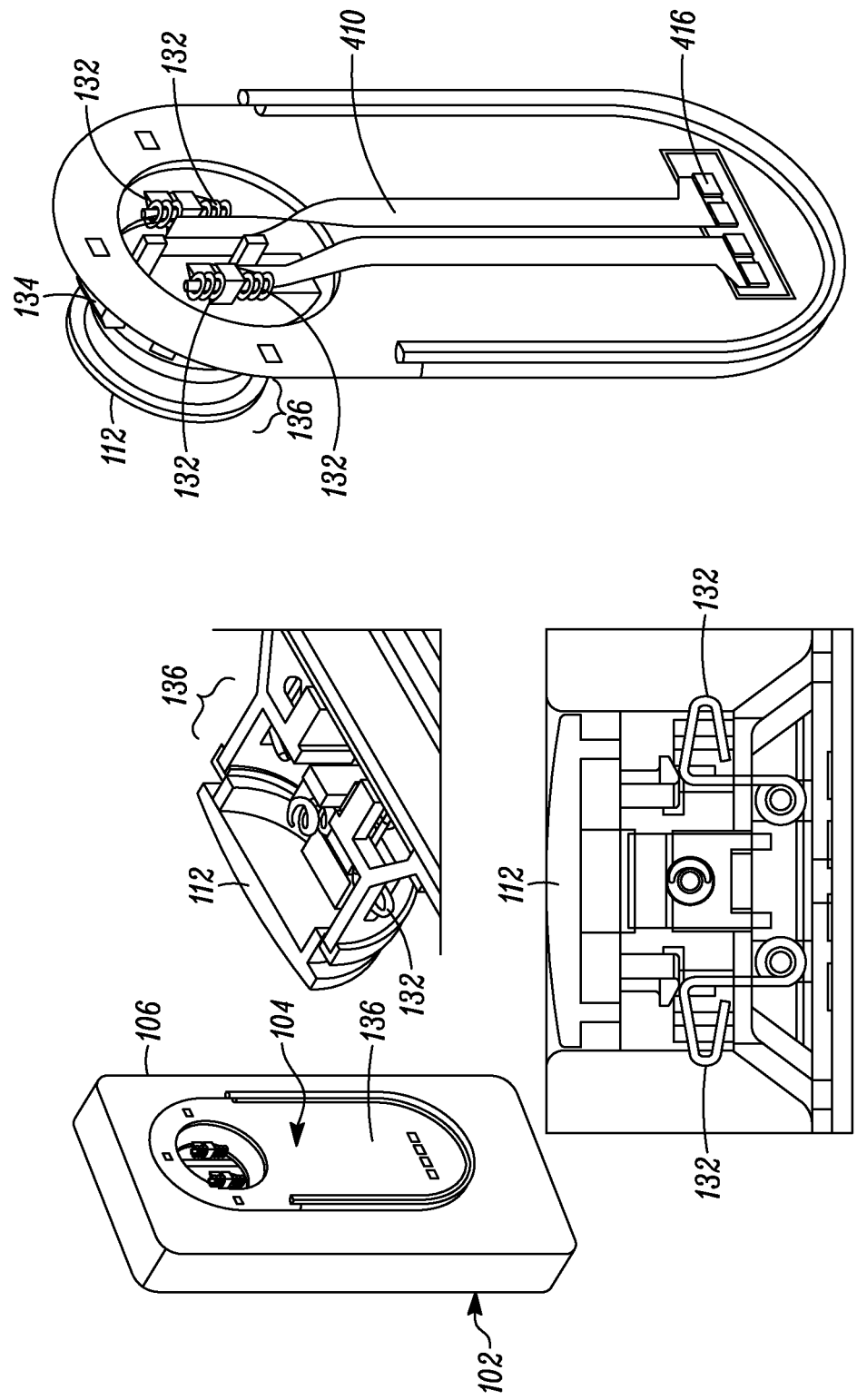
FIG. 4 shows cut-away views of the accessory and the accessory coupled to the radio in accordance with some embodiments.

FIG. 4 is a cut-away view of the accessory 104 coupled to the radio 102 in accordance with the various embodiments. This view shows detail pertaining to the electrical contacts 132. The contacts 132 at the interface are connected to the radio and its accessories respectively though either a Flexible Printed Circuit (FPC) or directly soldered to a Printed Circuit board (PCB) to a set of internal preset contacts 416. These preset contacts may be connected to, for example power, ground, audio, and LED type of circuitry within the accessory 104.

Figure 5:
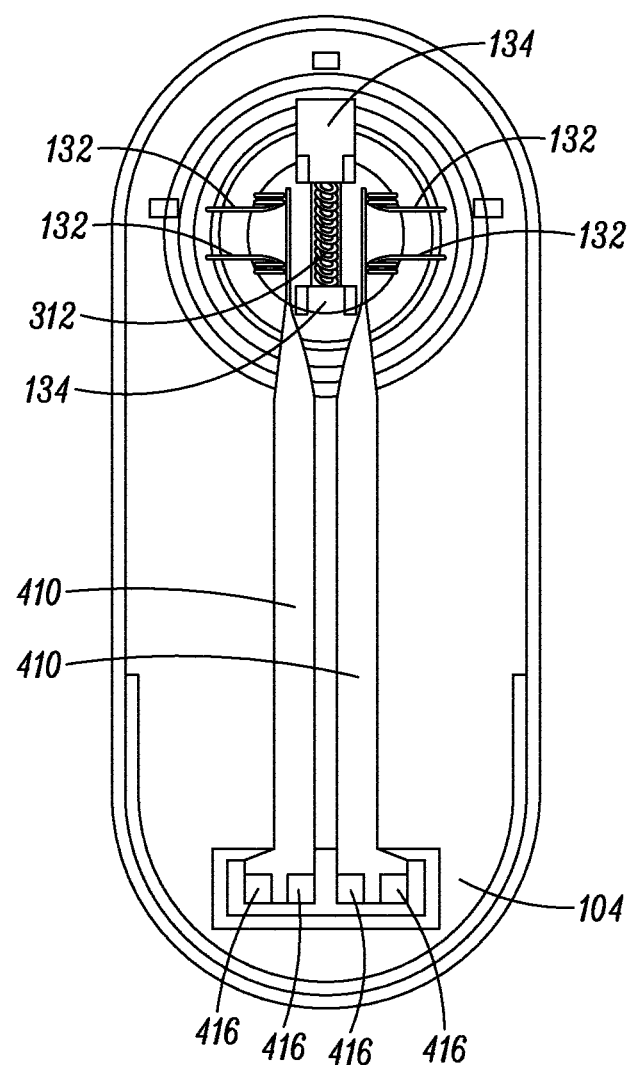
FIG. 5 shows a cut-away back view of the accessory in accordance with some embodiments.

FIG. 5 shows a cut-away back view of the accessory 104. In this view, the mechanical and electrical interface components of accessory 104 are shown. The mechanical interface components comprise coiled spring 312 coupled between first and second latches 134. The electrical interface comprises electrical contacts 132, flex 410, and flex contacts 416. The two non-rotatable latches 134 ensure desired direction and ensure the electrical contacts are connected to the terminal in the radio side and prevent inadvertent detachment of the accessory 104 from the radio 102. The modular interface provided by the various embodiments is thus able to extend to the various kinds of radio accessories.

Accordingly, there has been provided an interface system 100 with mechanical and electrical coupling features which provide a common base that accommodates a plurality of different accessories. The non-rotatable dual slot/latches ensure the accessory 104 is attached to the radio 102 in the desired direction and ensures the accessory electrical contacts 132 are connected to appropriate contacts 128 on the radio side. The through-hole 108 and release-button 112 providing dual slot/latches prevents inadvertent detachment of the accessory from the radio. The single release-button 112 controlling the latches 130 provides easy releasing of the accessory 102 from the radio 104 though a single push.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An interface system for communication devices, comprising:
    a radio having a through-hole opening from a front surface to a back surface, the through-hole forming a coaxial connector shaped interface for coupling to an accessory wherein the accessory comprises a circular release-button, first and second latches and electrical accessory contacts for mating and interconnecting with the coaxial connector shaped interface.

2. The interface system of claim 1, wherein the coaxial connector shaped interface accommodates a plurality of different interchangeable electronic accessories.

3. The communication interface system of claim 1, wherein the coaxial connector shaped interface comprises first and second slots and electrical radio contacts for mating with the accessory.

4. The communication interface system of claim 1, wherein the interface system once coupled together is non-rotatable.

5. The communication interface system of claim 1, wherein the through-hole forms an interior wall, the interior wall providing the coaxial connector shaped interface.

6. The communication interface system of claim 5, wherein the circular release-button has an exterior wall having the first and second latches and electrical accessory contacts along its perimeter.

7. The interface system of claim 3, wherein the first and second latches compress in response to the circular release-button being inserted within the through-hole.

8. The interface system of claim 7, wherein the first and second latches decompress in response to being inserted within the first and second slots.

9. The interface system of claim 8, wherein insertion of the first and second latches into the first and second slots provides alignment of the electrical radio contacts with the electrical accessory contacts.

10. The interface system of claim 1, wherein the accessory couples to the radio by turning the circular release-button into the through-hole, and the accessory is decoupled from the radio by a push of the circular release-button.

11. The interface system of claim 1, wherein the circular release-button comprises a coiled spring coupled between the first and second latches.

12. The interface system of claim 1, wherein the electrical accessory contacts are spring loaded contacts.

13. The interface system of claim 1, wherein the electrical accessory contacts are magnetic contacts.

14. The interface system of claim 1, wherein the accessory further comprises a flex coupled to the electrical accessory contacts.

15. An interface for coupling an accessory to a radio, comprising:
    a radio housing comprising:
    a through-hole forming an inner wall;
    a plurality of flat electrical contacts disposed upon the inner wall;
    a first slot and a second slot formed within the inner wall;
    an accessory housing comprising:
    a release-button extending therefrom;
    a plurality of spring loaded electrical contacts extending from the release-button;
    a first latch and a second latch coupled to the release-button;
    a coiled spring located within the release button, the coiled spring coupled between the first latch and the second latch; and
    the release-button being insertable into the through-hole of the radio housing for coupling the accessory to the radio, the release-button being removable from the through-hole of the radio housing for decoupling the accessory from the radio.

16. The accessory of claim 15, wherein the first and second latches compress inward upon insertion of the release-button into the through-hole, and the first and second latches decompress outward when aligned into the first and second slots, thereby retaining the latches within the slots and mating the spring loaded electrical contacts of the accessory with the flat electrical contacts of the radio.

17. The interface of claim 15, wherein the inner wall of the through-hole is a circular inner wall.

18. The interface of claim 15, wherein the interface is cable-less.

19. An interface for coupling and decoupling an accessory to and from a radio, comprising:
 a radio;
 a plurality of interchangeable accessories, the accessories being attachable to and removable from the radio via a coaxial interface, the coaxial interface comprising:
  at the radio:
   a though-hole forming a circular interior wall through the radio;
   a plurality of electrical contacts disposed on the circular interior wall;
   first and second slots formed within the circular interior wall;
  at the accessory:
   a release-button coupled to the accessory, the release-button having a top circular surface and an exterior wall extending therefrom;
   electrical accessory contacts located on the exterior wall;
   first and second spring loaded latches extending from the exterior wall;
   the accessory coupling to the radio in response to insertion of the release-button of the accessory into the through-hole of the radio thereby engaging the latches of the accessory into the slots of the radio and aligning the electrical accessory contacts with the electrical radio contacts; and
   the accessory decoupling from the radio in response a single push of the release button to release the spring loaded latches.

20. An interface system for communication devices, comprising:
 a radio having a through-hole opening from a front surface to a back surface, the through-hole forms an interior wall, the interior wall providing a coaxial connector shaped interface for coupling to an accessory; and
 wherein the accessory comprises a circular release-button having an exterior wall having first and second latches and electrical accessory contacts along its perimeter.

21. An interface system for communication devices, comprising:
 a radio having a through-hole opening from a front surface to a back surface, the through-hole forming a coaxial connector shaped interface for coupling to an accessory, wherein the accessory comprises a circular release-button and first and second latches that compress in response to the circular release-button being inserted within the through-hole.

22. An interface system for communication devices, comprising:
 a radio having a through-hole opening from a front surface to a back surface, the through-hole forming a coaxial connector shaped interface for coupling to an accessory, the coaxial connector shaped interface comprising first and second slots and electrical radio contacts for mating with the accessory;
 the accessory having a circular release button, first and second latches, and electrical accessory contacts;
 the first and second latches compressing in response to the circular release-button of the accessory being inserted within the through-hole of the radio; and
 the first and second latches decompressing in response to being inserted within the first and second slots of the coaxial connector shaped interface, wherein insertion of the first and second latches into the first and second slots provides alignment of the electrical radio contacts with the electrical accessory contacts.

23. An interface system for communication devices, comprising:
 a radio having a through-hole opening from a front surface to a back surface, the through-hole forming a coaxial connector shaped interface for coupling to an accessory, wherein the accessory comprises a circular release-button, and the accessory couples to the radio by turning the circular release-button into the through-hole, and the accessory is decoupled from the radio by a push of the circular release-button.

24. An interface system for communication devices, comprising:
 a radio having a through-hole opening from a front surface to a back surface, the through-hole forming a coaxial connector shaped interface for coupling to an accessory, wherein the accessory comprises a circular release-button and first and second latches, and wherein the circular release-button comprises a coiled spring coupled between the first and second latches.

\* \* \* \* \*